Oct. 4, 1932.  W. AULL, JR  1,881,394
REMOTE CONTROL APPARATUS
Filed Sept. 9, 1927  2 Sheets-Sheet 1
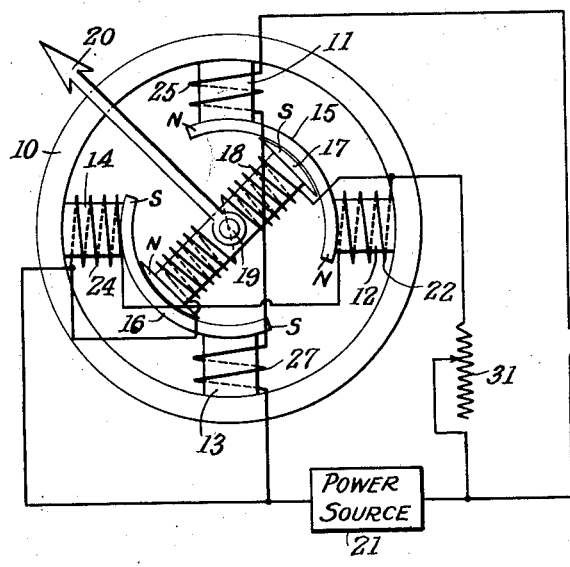
Fig. 1.
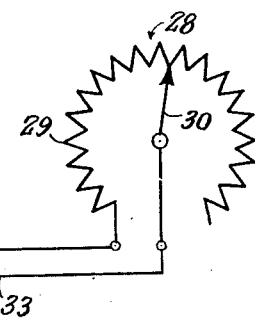
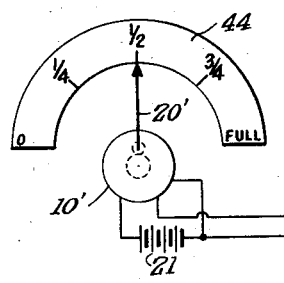
Fig. 2.
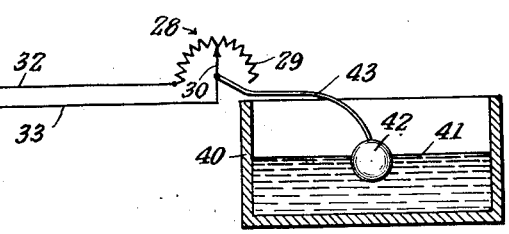
INVENTOR.
Wilson Aull, Jr.
BY
ATTORNEY Oct. 4, 1932.        W. AULL, JR        1,881,394
REMOTE CONTROL APPARATUS
Filed Sept. 9, 1927        2 Sheets-Sheet 2
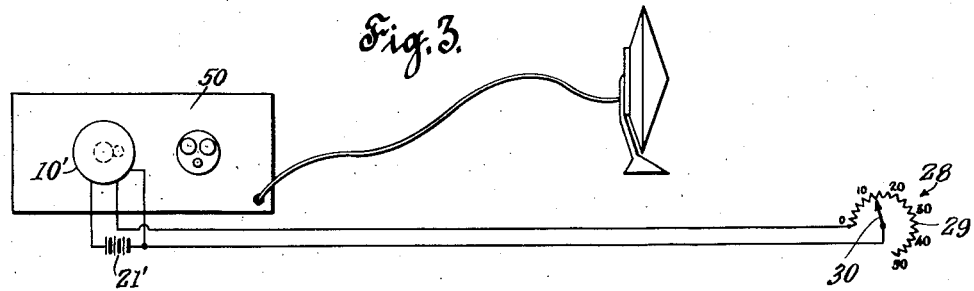
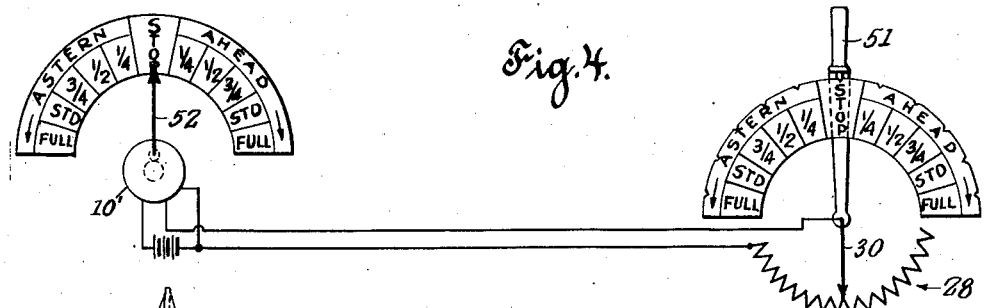
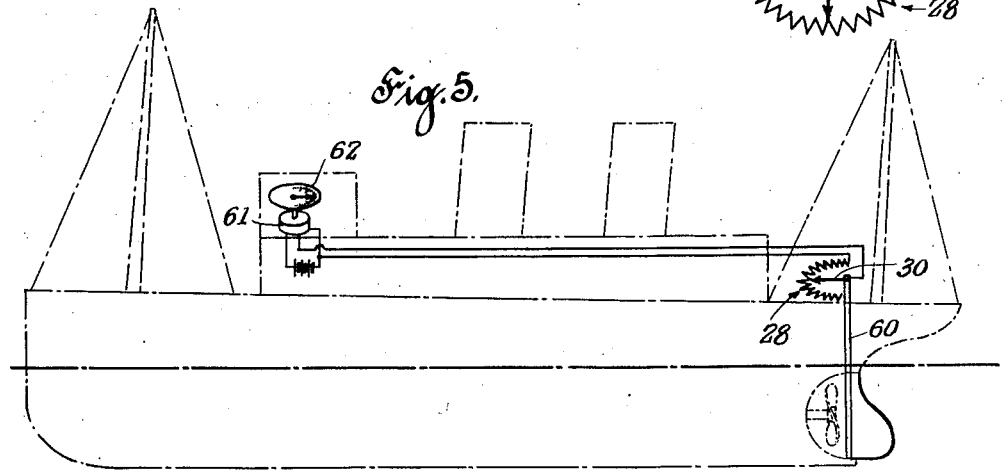
INVENTOR.
Wilson Aull, Jr.
BY Patented Oct. 4, 1932

1,881,394

UNITED STATES PATENT OFFICE

WILSON AULL, JR., OF ASTORIA, NEW YORK

REMOTE CONTROL APPARATUS

Application filed September 9, 1927. Serial No. 218,445.

One object of my invention is to indicate the position of and control the movement of a movable device at a distance by means of simple and yet accurate electrical means.

Another object is to controllably transmit angular motion to a distance.

Another object is to produce a simple electrical device in which the angular motion of a prime mover may be used to operate or adjust a local piece of apparatus quantitatively from a distance.

Another object is to produce an electrical indicating or motion translating device which is entirely independent, as to accuracy, of the state of the battery or other power source within wide limits.

The motor part of the device consists preferably of a number of field coils acting upon an armature. Groups of said field coils are arranged so as to act upon the armature in rotational opposition to each other. The strength of the current flowing in one set is constant for a given applied voltage. The strength of the current in the other group is controlled from a distant point. The armature will then take up a position dependent upon the relative strength of the field groups, and by properly proportioning the windings, control resistor, and other parts of the device, the motion of the armature may be made directly or otherwise proportional to the motion of the control device. As all the fields are operated from the one power source and as the position of the armature is due to the relative field strengths, these strengths will keep their same ratio regardless of voltage fluctuation at the power source so that the accuracy of the device is independent of the voltage of the power source as long as this does not fall below a point at which the device is no longer able to operate.

Referring to the drawings, Fig. 1 is a diagrammatic drawing of one form of motor, its control station and power source.

Fig. 2 is a diagrammatic drawing of my system in use as a liquid level indicator.

Fig. 3 shows a device used to remotely control the resonant frequency of a typical broadcast radio receiver.

Fig. 4 shows my invention as may be applied to marine engine room telegraph.

Fig. 5 shows a device applied to a ship as a helm indicator.

In Fig. 1, 10 is a field ring of ferrous material carrying the pole pieces 11, 12, 13 and 14 which in turn carry the pole tips or shoes 15 and 16. The armature 17 carries the winding 18 and is rotatably supported on the shaft 19 which in turn may carry the pointer or indicator 20 or a suitable coupling may be provided. The power source 21 may be a battery, transformer or any other suitable source. The poles 12 and 14 carry the windings 22 and 24 which may be of many turns of relatively fine wire and are of the type of windings sometimes known as "voltage windings". The armature winding 18 is of the same type. The windings 22 and 24 may be connected in series and across the power source 21 as may be the armature winding 18, or the windings 22, 18 and 24 may all be in series and connected across the power source. The windings 25 and 27 on the poles 11 and 13 may be of heavier wire or of the so-called "current operated" type, and may have in series with them and the power source the variable resistor 28 having the resistance winding 29 and the movable arm or contact 30. This resistor may have various shapes of windings and dimensions depending upon the type of motion it is desired to transmit or translate. The voltage windings 22 and 24 may be so proportioned that their flux is equal to the flux of the current windings when one-half the resistance of the resistor 28 is cut in. The operation is as follows:

The armature tends to take up the position of least average reluctance for the magnetic system as a whole. This position is that in which the magnetic center line of the armature will register with the position of maximum average flux density. This position is dependent upon the relation of the ampere turns or flux density of the poles 11 and 13 to the poles 12 and 14 which is in turn dependent upon the resistance in use at the resistor 39 and therefore the position of the arm 30. A small adjustable resistance 31 may be provided to compensate upon installation of varying lengths of the control lines 32 and 33. It will be seen as the position of the armature depends upon the relation between the ampere turns in the two branch circuits which in turn depends upon the resistance of these circuits it is independent of variations of voltage at the power source unless voltage should drop so low as to make the device inoperative.

Fig. 2 shows the device applied as a liquid level indicator. A tank 40 contains the liquid 41 which supports the float 42 which by means of the arm 43 changes the position of the slider or contact 30 of the variable resistor 28 which in turn operates the indicating hand 20' of the prime mover 10' through suitable gears, indicating upon the scale 44 the level of the liquid in the tank.

In Fig. 3, 50 represents a typical broadcast radio receiver of a uni-control type in which the motor 10' (like the motor of Fig. 1) has been substituted for the usual frequency control dial and the resonant frequency is now controlled by the rheostat 28 which may be calibrated in any desired manner, such as scale divisions, frequency or wave length. The fineness of angular control may be made as great as desired by increasing the power of the prime mover and providing a large number of steps, convolutions, or contacts on the rheostat 28. The power operating the prime mover may preferably be obtained from the source of power 21' used to heat the cathodes of the vacuum tubes in the receiver.

Fig. 4 shows my invention applied as one-half of a typical engine room telegraph for a power driven vessel.

Here the rheostat slider 30 is actuated by the hand lever 51 so as to control the motor 10' and move the indicator 52.

Fig. 5 shows a system applied to a bridge helm indicator for ships in which the arm or contact 30 of the resistor 28 is operated in some suitable manner by the rudder post 60 and the prime mover 61 (like 10) operates the indicator 62 upon the bridge or other desired point.

It should be understood that the magnetic structure of the device may be laminated so as to make it suitable for operation on alternating currents of commercial frequencies, and that several pairs of poles may be used with or without the magnetic connecting shoes and with both strengthening and neutralizing windings. It should be understood that I do not wish to limit myself to the magnetic structure, character of windings, type and configuration of control rheostat, or other matters of detail design except in so far as these matters are hereinafter limited by the following claims.

What I claim is:

1. Apparatus for quantitatively controlling motion from a distance which consists of at least one pair of potential operated poles and an equal number of pairs of current operated poles, a power source, an armature and a variable resistor, said potential operated poles being directly connected to said power source, said current operated poles being connected to said power source in series with said variable resistor, the direction of the resultant field being independent of variations in said source of voltage but inversely proportional to the resistance in circuit and energizing coils upon said armature to cause it to place itself in accordance with said field, the space between the ends of the armature and the poles affording a substantially constant air gap of uniform length.

2. A remote control motor comprising a field ring having pairs of projecting poles some of which have current windings and some of which have potential windings, a compensating resistance in series with the potential windings and an armature having potential windings, the space between the ends of the armature and the poles affording a substantially constant air gap of minimum length.

3. A differentially actuated motor including a rotatable polarized armature and at least two pairs of pole pieces, similarly excited pole pieces being joined by a single arcuate elongated pole shoe, said shoe providing an air gap of substantially uniform length between said pole pieces and said armature.

WILSON AULL, Jr.